United States Patent
Krupke

(10) Patent No.: US 7,283,576 B2
(45) Date of Patent: Oct. 16, 2007

(54) OPTICALLY-PUMPED DUV ATOMIC VAPOR LASERS

(76) Inventor: William F. Krupke, 1564 Foothill Rd., Pleasanton, CA (US) 94588

( * ) Notice: Subject to any disclaimer, the term of this patent is extended or adjusted under 35 U.S.C. 154(b) by 227 days.

(21) Appl. No.: 10/877,289

(22) Filed: Jun. 24, 2004

(65) Prior Publication Data
US 2005/0031003 A1 Feb. 10, 2005

Related U.S. Application Data

(60) Provisional application No. 60/480,771, filed on Jun. 24, 2003.

(51) Int. Cl.
H01S 3/227 (2006.01)

(52) U.S. Cl. .......................... 372/56; 372/55

(58) Field of Classification Search .............. 372/55, 372/56
See application file for complete search history.

(56) References Cited

U.S. PATENT DOCUMENTS

| | | | |
|---|---|---|---|
| 4,188,591 A | 2/1980 | Siegman et al. | 331/94.5 |
| 5,769,844 A | 6/1998 | Ghaffari | 606/16 |
| 6,525,868 B2 * | 2/2003 | Merriam et al. | 359/326 |

OTHER PUBLICATIONS

A. V. Smith, W. J. Alford, and G. R. Hadley, "Optimization of two-photon-resonant, four-wave mixing: application to 130.2-nm generation in mercury vapor", J. Opt. Soc. Am., B5, 1503-1519 (1988).
A. Caprara, S. Butterworth, Y. Kil, T. Thonn, K. Hubbard, A. MacLeod, E. Rea, C. Seaton, and L. Spinelli, "200 mW continuous wave laser source at 198.5 nm for lithographic applications", SPIE symposium Optical Microlithography XVII, Santa Clara, CA Feb. 23-27, 2004. To be published in SPIE proceedings vol. 5377.
M. Artusy, N. Holmes, and A. E. Siegman, "dc-excited and sealed-off operation of the optically pumped 546.1 Hg laser", Appl. Phys. Letters, 28, 133-134 (1976).
N. C. Holmes and A. E. Siegman, "The optically pumped mercury vapor laser", J. Applied Physics, 49, 3155-3170 (1978).
N. Djeu and R. Burnham, "Optically pumped cw Hg laser at 546.1 nm" Appl. Phys. Letters, 25, 350-351 (1974).
V. B. Znamenskii, "Optically pumped pulsed laser with a mixture of mercury ($\lambda$=546.1 nm) and nitrogen", Sov. Phys. Tech. Phys., 23, 244-245 (1978).

* cited by examiner

*Primary Examiner*—Minsun Oh Harvey
*Assistant Examiner*—Roy Finneren
(74) *Attorney, Agent, or Firm*—John P. Wooldridge

(57) ABSTRACT

Optically-pumped group IIB atomic vapor lasers emitting at discrete wavelengths shorter than 230 nm are disclosed. This laser device utilizes an active medium comprising a mixture of a group IIB atomic vapor and one or more buffer gases placed within a doubly-resonant optical cavity that enables the realization of a population inversion between the first $^1P_1$ level and the $^1S_0$ ground level of the group IIB atoms. The laser may operate in a pure continuous-wave mode, or in a high-repetition pulsed mode, at DUV wavelengths of ~185 nm (mercury), ~229 nm (cadmium) and ~214 nm (zinc).

21 Claims, 9 Drawing Sheets

OPTICALLY-PUMPED DUV ATOMIC VAPOR LASERS

This application claims priority to U.S. Provisional Patent Application Ser. No. 60/480,771, filed Jun. 24, 2003, titled: "OPTICALLY-PUMPED 185.0 NM MERCURY VAPOR LASER," incorporated herein by reference.

BACKGROUND OF THE INVENTION

1. Field of the Invention

The present invention relates generally to deep ultraviolet (DUV) lasers, and more specifically, it relates to DUV optically-pumped atomic vapor lasers (DUV-OPAVLs).

2. Description of the Related Art

As the feature size of silicon microelectronic integrated circuits (ICs) continues to decline in the quest for ever-higher speeds (from~a micron five years ago to a projected ~0.1 micron in the next few years), there continues to be an urgent need for practical laser sources with progressively shorter operating wavelengths from the present main production operating wavelength of 248 nm, and beyond the emergent advanced production operating wavelength of 193 nm. Such sources are needed to: 1) provide exposure radiation for patterning IC silicon wafers, in either a conventional reticle-based or a maskless-based exposure tool, 2) write photomasks of fine-line patterns for the manufacture of ICs, and 3) detect and classify wafer defects of progressively smaller size, assisting in the cost effective manufacture of ever-higher speed ICs. High-repetition-rate pulsed laser sources can be utilized for some of these applications, but continuous-wave lasers are often greatly preferred. The laser sources must be scalable in power to achieve sufficient process throughputs compatible with commercial production economics.

Production lithographic exposure laser sources require operating powers of up to several tens of watts which currently can be provided only by rare gas excimer lasers (KrF at 248 nm, ArF at 193 nm, and $F_2$ at 157 nm). These lasers are necessarily pulsed lasers and are designed to operate at pulse-repetition-rates of up to several kHz. Each of these exposure lasers delivers its output radiation in the form of a hundred-kilowatt-level peak power pulses. The high peak intensity of these illumination sources can cause two-photon optical damage in optical elements of the lithographic imaging system. To avoid such effects a continuous wave exposure source of the same average power would be advantageous. To achieve the highest possible image resolution at a given exposure wavelength, it is advantageous to use an exposure source with extremely narrow spectral line-width (mitigating the effects of chromatic dispersion arising from optical elements in the optical train of the imaging system). In the case of the KrF and ArF excimer lasers, additional optical elements must be included in the laser resonator to effectively narrow the line-width of the output radiation, adding complexity and expense to these exposure lasers. Additionally, these excimer lasers require the use of corrosive and potentially dangerous halogen gases, also increasing the cost of ownership of these lithographic exposure sources. Thus, there continues to be a need for the development of continuous-wave, or of low-peak-power high-repetition-rate (i.e., >tens of kHz), narrowband lithographic exposure sources in the sub-250 nm spectral region, which can be scaled in output power to several tens of watts. Such a laser operating at lower power in the 0.1–1 watt range can also satisfy the needs for photomask writing and defect detection and identification. The effectiveness of these applications will significantly improve with the use of laser sources with operating wavelengths shorter than the presently commercially available sources at 244 nm and 257 nm. Again, continuous-wave or very high repetition rate laser source waveforms are highly desirable. Other applications such as 3-D rapid prototyping can also benefit from the availability of such lasers.

It can be appreciated that several sub ~250 nm ultraviolet lasers have been known for years. These lasers are of several types. The first known such lasers were produced by high-current discharges in various atomic gases, such as argon, neon, and xenon. Generally, sub-250 nm laser transitions take place in the rare gas ions so that these lasers are generally quite inefficient (<<1%), are bulky, and require expensive power conditioning equipment More recently, sub-250 nm laser sources have been produced using non-linear conversion processes to convert radiation from a "drive" laser emitting at longer wavelengths into the shorter wavelength region. Because the efficiency of such non-linear conversion processes scale with the intensity of the longer wavelength drive laser, efficient sub-250 nm lasers generally utilize a pulsed drive laser having a peak intensity generally in excess of 10 MW/cm$^2$. At such intensities, nonlinear optical materials tend to degrade due to optical damage. This is particularly so for nonlinear optical materials operating with output wavelengths sub-250 nm. Thus, sub-250 nm lasers produced using a nonlinear material to generate sub-250 nm radiation are not reliable, and complicated and expensive defensive measures must be adopted, such as periodically translating the nonlinear optical crystal transversely to the drive laser input beam to operate in an undamaged region of the crystal. Yet another approach to producing sub-250 nm lasers is to utilize a gaseous medium, such as xenon or mercury vapor, as a nonlinear conversion medium [1,2]. Again, to realize practically efficient conversion of drive laser radiation into sub-250 nm radiation, drive laser(s) providing high peak power pulses typically in excess of 10 MW/cm$^2$ are utilized. It is also necessary to restrict the drive laser to operate in a single well-controlled frequency so as to achieve and maintain stable four-wave phase-matched conditions within the nonlinear mixing medium. While the optical damage problem of solid nonlinear optical materials is avoided, realization of efficient continuous-wave operation is generally precluded (as is operation even with low peak-power pulses and many tens of kHz pulse repetition rate).

Primarily argon ion lasers have been utilized for fine features defect detection in IC manufacturing. Defects on printed wafers have typically been detected utilizing argon ion lasers emitting 488 nm radiation and those on reticles (masks) have typically been detected utilizing argon lasers whose 488 nm and 514 nm radiation outputs have been frequency-doubled to 244 nm and 257 nm, respectively. While providing adequate power and spectral brightness, argon ion lasers are extremely inefficient (<0.01%), require extensive conditioned electrical power and active cooling, and are physically bulky. The stressing operating conditions within an argon laser generally limit the operating lifetime of a typical argon ion laser tube to <10,000 hours. Thus, there is a need to develop ultraviolet laser sources that are more than an order of magnitude more efficient (i.e., >1%), are much more compact, and require only comparably benign utilities.

In recent years, diode-pumped solid-state lasers have been developed to replace argon ion lasers with performance features that are superior to the argon ion laser. Generally, these lasers comprise a diode-pumped solid-state crystal (such as Nd: YAG or Nd: YVO$_4$) emitting "fundamental" radiation in the near infrared spectral region (i.e., $\lambda$~1064 nm), and one or more harmonic nonlinear optical (NLO) crystal converters. The NLO elements convert the fundamental IR radiation into radiation of shorter "harmonic" wavelengths: $\lambda/2$, $\lambda/3$, $\lambda/4$, etc (i.e., 532 nm, 355 nm, 266 nm, respectively). Practically efficient harmonic conversion requires of the NLO crystal that:

- its birefringence is such that the NLO conversion process is "phase-matched" (i.e., the indices of refraction at both fundamental and harmonic wavelengths are equal);
- its nonlinearity is adequately large;
- it is adequately transparent at all operating wavelengths; and
- its intensity threshold for optical damage substantially exceeds that of the drive intensity needed for efficient NLO conversion.

A decade-long sustained search for practical NLO crystals has resulted in the identification and development of only a few NLO crystals meeting the requirements itemized above, especially for harmonic wavelengths lying in the ultraviolet (UV) and deep ultraviolet (DUV) spectral regions. Among these are lithium borate (LBO), beta-meta-borate (BBO), and cesium-lithium borate (CLBO). The former two NLO crystals have now found extensive commercial service in laser sources operating at wavelengths down to ~244 nm. In attempts to utilize these crystals at even shorter wavelengths, problems with conversion efficiency and operating lifetime decreases substantially due to a narrowing between the required drive intensity for practical conversion efficiency and the threshold intensity for optical damage. Thus, there is a need to find a practical alternative means for converting the radiation of laser sources operating at wavelengths of ~266 nm or longer (e.g., harmonically converted DPSSLs) to laser radiation of wavelengths shorter than ~250 nm.

Very recently, a continuous-wave 198.5 nm laser source has been demonstrated based on sum frequency mixing in a CLBO nonlinear crystal of a 244 nm frequency doubled argon ion laser and a 1064 nm Nd:YVO$_4$ laser. Because of the very low efficiency of the argon ion laser, this laser scheme is not regarded as practical for commercial use. A future embodiment would replace the 244 nm argon ion laser with a 244 nm source based on an optically-pumped semiconductor laser emitting at a fundamental wavelength of 976 nm as the primary drive laser [3]. This drive laser would be converted to 244 nm radiation by resonant-cavity fourth-harmonic generation in nonlinear optical crystals; this radiation would then be coherently mixed with radiation from a separate diode-pumped solid state laser source emitting near one micron using CLBO as the mixing nonlinear optical crystal. The cost and performance of this type of source is burdened by the requirements of phase-matching all drive and output waves (in resonant optical cavities) and optical damage in CLBO at wavelength below 200 nm.

The present invention provides a practical means for the efficient conversion of laser sources operating at selected wavelengths longer than ~250 nm into a laser source operating at ultraviolet wavelengths shorter than ~230 nm, without utilizing or subjecting a NLO crystal to irradiation at the <230 mm wavelength of the laser output, where NLO crystal converters tend to lose their practical effectiveness. The present invention teaches how atomic vapors of the group IIB elements of the periodic table of the elements (mercury (Hg); cadmium (Cd); and zinc (Zn)) can be utilized to efficiently "sum" the output power of certain "drive" or pump lasers whose output wavelengths match certain transition wavelengths of the vapor atoms, when the vapor is mixed with an appropriate buffer gas (or buffer gas mixture) and placed within a laser resonator cavity that has sufficiently high reflectivities (or Q-factors) at the appropriate wavelengths. This type of laser device is referred to herein as a deep ultraviolet optically-pumped atomic vapor laser, or DUV OPAVL. The power summing process scales with drive laser intensities and, due to the large strengths of the atomic transition dipoles involved in the power summing process, the operating drive intensities are several orders of magnitude lower than those found in conventional lasers using NLO crystal converters (i.e., 10's of kW/cm$^2$ vs. 10's of MW/cm$^2$). At the same time, there is no requirement for "phase-matching" the input and output waves, since the conversion process itself is incoherent. Analysis also shows that, because of their relatively large transition cross-sections and relatively low corresponding saturation intensities, these optically-pumped group IIB atomic vapor lasers can efficiently generate laser power with a purely continuous-wave temporal waveform, or with a train of relatively low-peak-power pulses at repetition rates of many tens of kHz. Therefore, the life-limiting optical damage processes present in conventional NLO wavelength converters at wavelengths shorter than ~230 nm are absent in this type of radiation converter, providing for long-lived power conversion in the DUV spectral region below ~230 nm. This novel class of optically-pumped group IIB atomic vapor lasers differs essentially from the teachings of Ghaffari [4] who describes a mercury vapor based high power light system for medical applications. It also differs fundamentally from the 546.1 nm mercury vapor laser taught by Siegman, et al. [5–7], by Djeu [8] and by Znamenskii [9], which teach mercury vapor lasers that are optically-pumped by an rf discharge in mercury vapor, where the 546.1 nm laser transition does not terminate on the mercury atom ground level, and does not operate in the DUV.

SUMMARY OF THE INVENTION

A primary object of the present invention is to provide optically-pumped group IIB atomic vapor lasers emitting at wavelength shorter than ~230 nm, overcoming shortcomings of the prior art devices.

An object of the present invention is to provide continuous-wave, or low-peak-power, high-repetition-rate optically-pumped group IIB atomic vapor lasers operating on fully-allowed electric-dipole transitions terminating on the ground levels of the neutral group IIB atoms.

An object of the present invention is to provide a novel means of creating a steady-state population inversion density between the $^1P_1$ excited levels and the $^1S_0$ ground level of each of the group IIB atoms.

An object of the present invention is to provide a novel means of creating a repetitive transient population inversion density between the $^1P_1$ excited levels and the $^1S_0$ ground level of each of the group IIB atoms.

Other objects and advantages of the present invention will become apparent to the reader and it is intended that these objects and advantages are within the scope of the present invention.

In view of the disadvantages inherent in the known types of sub-230 nm DUV lasers now present in the prior art, the present invention provides a practical means to realize continuous-wave (or low-peak-power, high-repetition-rate) lasers in which the laser comprises an active medium of a mixture of a group IIB atomic vapor and at least one buffer gas, contained within a laser cavity having high reflectivities, or Q-factors, at two specific wavelengths dictated by the electronic structure of the group IIB atomic vapor being utilized.

The present invention generally comprises a laser gain medium, placed within a laser cavity with high Q-factors at two specified wavelengths, and two laser "drive" or pump sources to optically pump the gain medium. The laser gain medium comprises a mixture of a group IIB atomic vapor and appropriate buffer gas (or gases). The buffer gas (or gases) is (are) selected to serve three functions: 1) to collisionally broaden the group IIB atom transitions so that their spectral lineshapes are predominately Lorentzian in character, rendering the transitions effectively spectrally homogeneously broadened; 2) to collisionally drive the electron populations in the cluster of $^3P_{0,1,2}$ levels toward a Boltzman population distribution characterized by a temperature near to the buffer gas translational temperature; and 3) to serve as a heat bath to take up waste heat generated in the energy-summing processes of the OPAVL. The gain medium is contained in a gain cell that, in turn, is placed within the laser cavity formed by two or more cavity mirrors, and having high Q-factors at two wavelengths, one corresponding to the wavelength of a specific "internal idler laser transition" and the other corresponding to the wavelength of the output of the OPAVL emitting on the first electric-dipole-allowed DUV resonance transition of the group IIB atom. To more clearly and quantitatively describe the present invention, the specific example of an optically-pumped mercury laser with a wavelength of 185 nm is described in detail below. Optically-pumped cadmium and zinc group IIB lasers, emitting at 229 nm and 214 nm, respectively, operate in an analogous manner.

In a mercury OPAVL, radiation at wavelengths of 253.7 nm and 404.8 nm from two pump lasers is directed into the gain cell, and is absorbed by the mercury vapor in a two-step incoherent energy-summing process. This two step excitation process generates a first population inversion and laser oscillation on the 1207 nm transition between the 6s 7s $^3S_1$ and 6s 6p $^1P_1$ levels (designated the internal "idler" laser transition); this laser oscillation, in turn, generates a second population inversion between the 6s 6p $^1P_1$ level and the $6s^2$ $^1S_0$ ground level of the mercury atom, resulting in laser action and generation of DUV-OPAVL output power at 185.0 nm in the 6s 6p $^1P_1$–$6s^2$ $^1S_0$ resonance transition.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
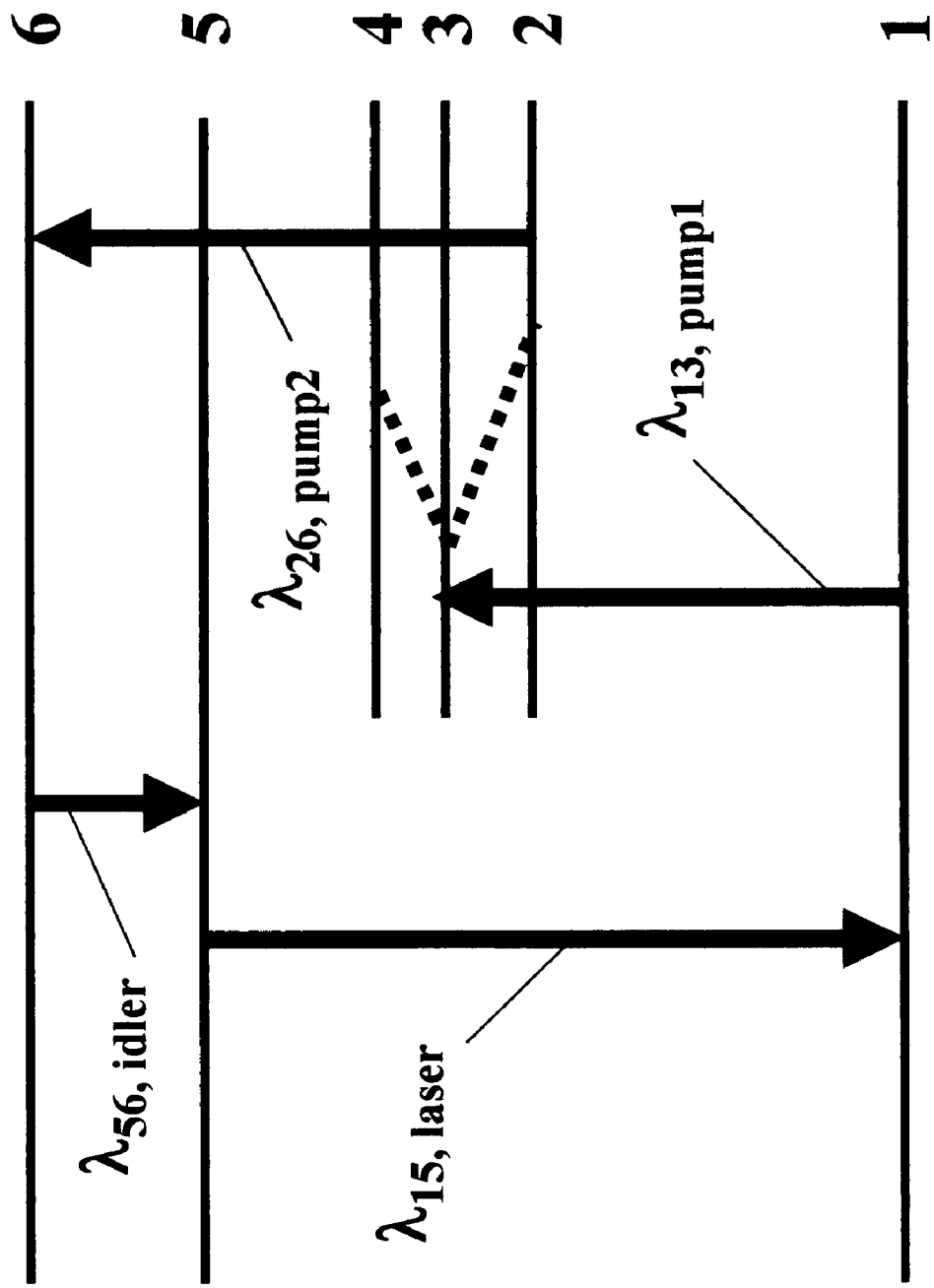
FIG. 1 shows the energy levels of a group IIB vapor atom utilized as the energy-summing medium in a DUV-OPAVL device.

FIG. 1 shows the working energy level scheme of a group IIB atomic vapor medium used in the DUV-OPAVL. Six primary electronic levels are depicted, labeled 1 through 6. Initially the atomic vapor is quiescent and all vapor atoms reside in the ground level, labeled 1. The radiation from a first "drive" or pump laser whose output wavelength, $\lambda_{13,pump1}$, substantially matching that of the atomic vapor transition labeled 1–3 is propagated into the vapor, exciting vapor atoms from the ground level 1 to the level labeled 3. With an appropriate buffer gas or a mixture of buffer gases, such as helium and nitrogen, mixed in with the atomic vapor, the electron population excited into level 3 will redistribute into the adjacent energy levels labeled 2 and 4 upon collisions with the buffer gas atoms and/or molecules, approaching a Boltzmann population distribution among levels 2, 3, and 4 characterized by a temperature substantially equal to the buffer gas translational temperature. The constituents of the buffer gas mixture must be chosen such that the quasi-thermalization of the triplet of levels 2, 3, 4 is achieved without significant quenching of the excited electronic population back to the ground level. The buffer gas or gas mixture is selected to also collisionally broaden the group IIB atomic transitions so that their spectral lineshapes become predominately Lorentzian, and so that the transitions become effectively spectrally homogeneously broadened. Suitable buffer gases include the rare gas atoms (He, Ar, Kr, Ne, and Xe)

and the molecules of nitrogen ($N_2$) and carbon monoxide (CO). The radiation from the second "drive" or pump laser, whose output wavelength, $\lambda_{26,pump}$, substantially matches that of the vapor transition labeled 2–6, further excites the electron population that has relaxed to energy level 2 to the energy level labeled 6. When this doubly-excited atomic vapor is placed within a laser cavity that has a high reflectivity, or Q-factor, at a wavelength, $\lambda_{56,idler}$, corresponding to the internal "idler" transition labeled 5–6, laser action in this idler transition occurs, rapidly and selectively transferring electron population from level 6 to level 5. This rapid stimulated emission process, in turn, generates a population inversion between level 5 (the upper laser level of the DUV-OPAVL) and the (terminal) ground level, 1. Laser output occurs at a wavelength, $\lambda_{15,laser}$ when the laser cavity has an appropriately high Q-factor at this wavelength. The internal "idler" laser action is critical to the functioning of the OPAVL, because literature data indicate that excited electron population in level 6 cannot be transferred to the upper laser level 5 rapidly and selectively enough through kinetic collisions with one or more buffer gases to permit a practical and efficient OPAVL to be realized. Detailed calculations using mercury as the active group IIB vapor (for which the needed spectroscopic and kinetic data is in the literature) show that, assuming appropriate continuous-wave first and second pump laser intensities injected into the DUV-OPAVL vapor placed within the laser cavity with appropriate cavity mirrors, a steady-state population inversion can be produced between vapor levels labeled 5 and 1 (the ground level), and a continuous-wave laser output from the DUV-OPAVL can be obtained at a wavelength, $\lambda_{15,laser}$. Detailed calculations using mercury as the active group IIB vapor also show that, with the appropriate repetitively-pulsed first and second pump intensities and pulse durations injected into the DUV-OPAVL vapor placed within the laser resonator cavity with appropriate cavity mirrors, a repetitive transient population inversion can be produced between vapor levels labeled 5 and 1, and that a repetitively-pulsed laser output from the DUV-OPAVL can also be obtained at a wavelength, $\lambda_{15laser}$. In general, the output wavelength is shorter than either of the input pump laser wavelengths, so that the DUV-OPAVL constitutes an energy-summing or "up-conversion" device. Note that the DUV-OPAVL operates on electron population inversions whose kinetics can be described by rate equations and that "phase-matching" of the input and output beams is not necessary, as is characteristic of conventional NLO up-conversion processes.

Figure 2:
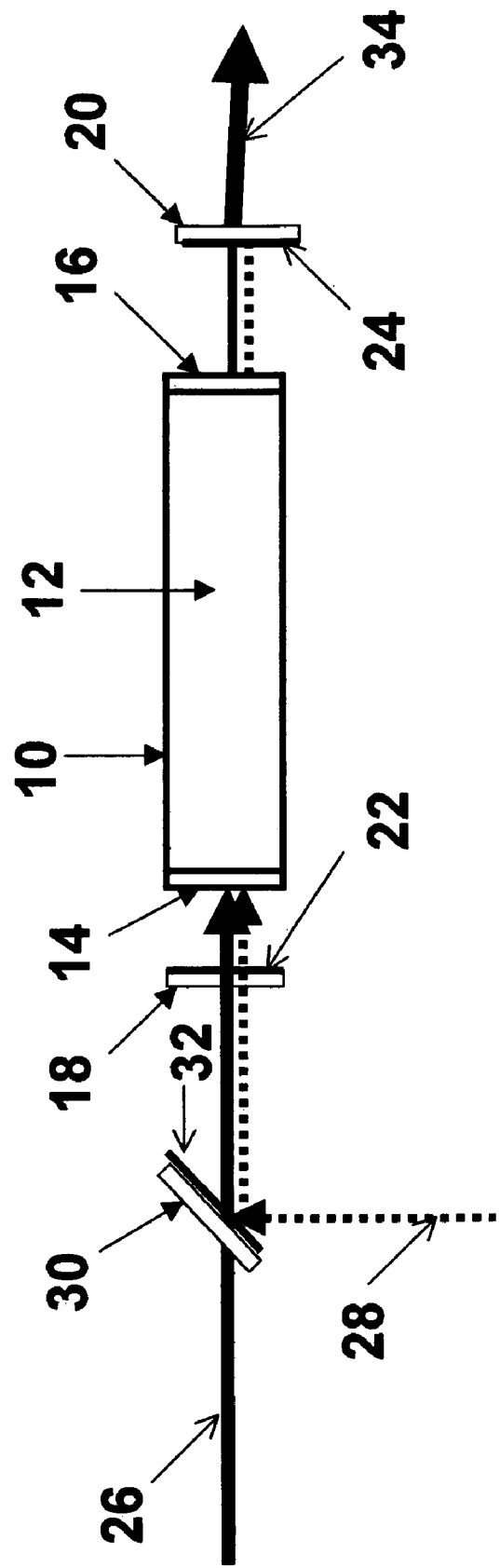
FIG. 2 shows a schematic optical layout of a DUV-OPAVL.

FIG. 2 shows a schematic optical layout of an embodiment of the present DUV-OPAVL invention. It comprises a vapor/buffer-gas cell 10, terminated at each end with windows 14 and 16 that are transparent at all of the wavelengths involved in DUV-OPAVL operation. The converter cell 10 contains an appropriate mixture 12 of an atomic vapor (such as mercury, cadmium or zinc) and a buffer gas, or a mixture of buffer gases (such as nitrogen, argon, and helium), and is placed within a laser cavity formed by mirrors 18 and 20. The inner surface (facing the vapor/buffer-gas cell) of first laser cavity mirror 18 is coated with a dichroic thin-film dielectric stack 22 that provides high transmission at the wavelength, $\lambda_{13,pump1}$ of the first pump laser beam 26 and at the wavelength $\lambda_{26,pump2}$ of the second pump laser beam 28, while providing high reflectivities at the internal "idler" wavelength $\lambda_{56,idler}$ of the atomic vapor and at the output wavelength $\lambda_{15laser}$ of the DUV-OPAVL device. The surface of the laser resonator cavity mirror 20 is coated with a dichroic coating 24 that provides high reflectivities at the wavelengths $\lambda_{13,pump1}$, $\lambda_{26,pump2}$, $\lambda_{56,idler}$ and some intermediate reflectivity value at wavelength $\lambda_{15,laser}$ that optimizes the output power of the DUV-OPAVL device. To implement the energy-summing, up-conversion process in the DUV-OPAVL, the pump laser beams, 26 and 28 of the first and second pump lasers, respectively, are spatially combined by the beam combining element 30 with dichroic coating 32 on its surface, and both are injected co-axially into the vapor cell along its axis.

Figure 3:
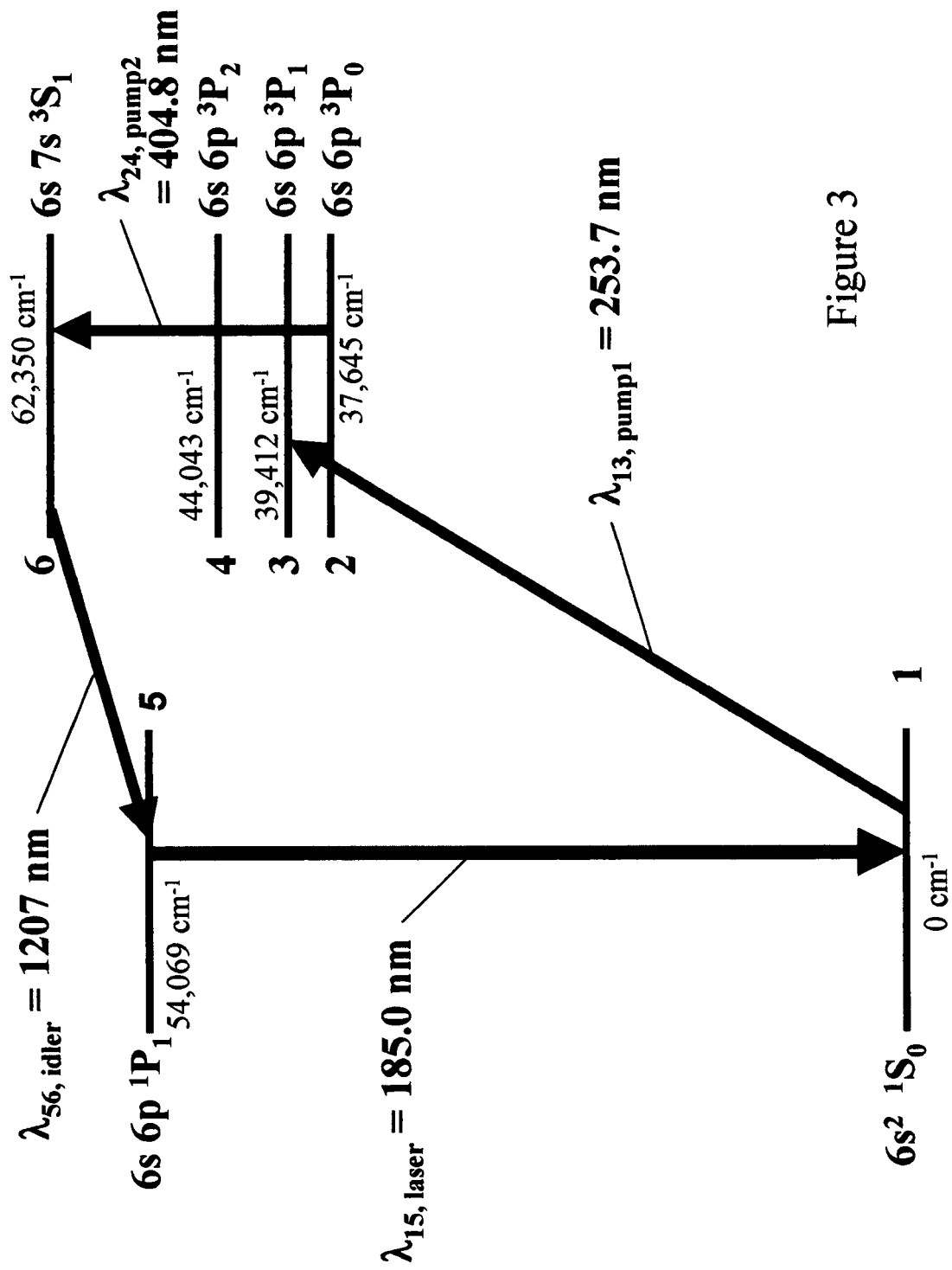
FIG. 3 shows an energy level scheme of the mercury atom utilized as the energy-summing atom in a 185.0 nm DUV-OPAVL.

An OPAVL based on mercury as the active medium is next considered as a detailed example. FIG. 3 shows the energy level scheme for the mercury atom. In the mercury 185.0 nm DUV-OPAVL, the first pump laser wavelength $\lambda_{13,pump1}$ is set to 253.7 nm (corresponding to the $6s^2\ ^1S_0$–$6s\ 6p\ ^3P_1$ transition); and the second pump laser wavelength $\lambda_{26,pump2}$ is set to 404.8 nm, corresponding the $6s\ 6p\ ^3P_0$–$6s\ 7s\ ^3S_1$ transition. The internal "idler" transition wavelength $\lambda_{56,idler}$ is 1207 nm, corresponding to the $6s\ 7s\ ^3S_1$–$6s\ 6p\ ^1P_1$ transition, and the DUV-OPAVL output wavelength $\lambda_{15,laser}$ is 185 nm, corresponding to the $6s\ 6p\ ^1P_1$–$6s^2\ ^1S_0$ resonance transition of the mercury atom.

185.0 nm Mercury DUV-OPAVL

Table 1 below contains a summary of the key spectroscopic parameter values necessary to assess the laser performance of a mercury DV-OPAVL (assuming a buffer gas of nitrogen at one atm). The performance of a continuous-wave 185.0 nm mercury DUV-OPAVL was calculated assuming the following: 1) rate equations govern the populations of all electronic levels; 2) a plane-wave treatment of both pump lasers, and idler and DUV-OPAVL output laser beams; 3) bleaching and saturation ground level population; 4) optimization of DUV-OPAVL output coupling reflectivity; 5) stimulated absorption and emission of all radiation waves.

As an example of a continuous-wave mercury OPAVL, Table 2 gives the projected performance of a 185.0 nm mercury laser designed to produce >200 mW of output radiation.

TABLE 1

Mercury atom spectroscopic laser parameters

| Parameter | Value | Units |
|---|---|---|
| Level 1 designation | $^1S_0$ | |
| Level 1 degeneracy | 1 | |
| Level 1 energy | 0.00 | $cm^{-1}$ |
| Level 2 designation | $^3P_0$ | |
| Level 2 degeneracy | 1 | |
| Level 2 energy | 37645.08 | $cm^{-1}$ |
| Level 2 radiative lifetime | 2 | msec |
| Level 3 designation | $^3P_1$ | |
| Level 3 degeneracy | 3 | |
| Level 3 energy | 39412.977 | $cm^{-1}$ |
| Level 3 radiative lifetime | 120 | nsec |
| Level 5 designation | $^1P_1$ | |
| Level 5 degeneracy | 3 | |
| Level 5 energy | 54068.781 | $cm^{-1}$ |
| Level 5 radiative lifetime | 1.48 | nsec |
| Level 6 designation | $^3S_1$ | |
| Level 6 degeneracy | 3 | |
| Level 6 energy | 62350.456 | $cm^{-1}$ |
| Level 6 radiative lifetime | 9.68 | nsec |
| First pump level labels | 1–3 | |
| First pump wavelength | 253.7 | nm |
| First pump transition peak cross-section | 1.5 | $10^{-13}\ cm^2$ |
| First pump saturation intensity | 44.0 | $W\ cm^{-2}$ |
| First pump transition linewidth (FWHM) | 0.0000907 | nm |
| Second pump level labels | 2–6 | |
| Second pump wavelength | 404.8 | nm |
| Second pump transition peak cross-section | 4.1 | $10^{-13}\ cm^2$ |
| Second pump saturation intensity | 120 | $W\ cm^{-2}$ |

TABLE 1-continued

Mercury atom spectroscopic laser parameters

| Parameter | Value | Units |
|---|---|---|
| Second pump transition linewidth (FWHM) | 4.142 | GHz |
| Idler laser level labels | 5–6 | |
| Idler laser wavelength | 1207 | nm |
| Idler transition peak cross-section | 0.42 | $10^{-13}$ $cm^2$ |
| Idler laser saturation intensity | 395 | W $cm^{-2}$ |
| Idler transition linewidth (FWHM) @ 1 atm $N_2$ | 4.142 | GHz |
| Output laser level labels | 1–5 | |
| Output laser wavelength | 185.0 | nm |
| Output transition peak cross-section | 35.3 | $10^{-13}$ $cm^2$ |
| Output laser saturation intensity | 204 | W $cm^{-2}$ |
| Output laser transition linewidth (FWHM) @ 1 atm $N_2$ | 8.56 | GHz |

Figure 4:
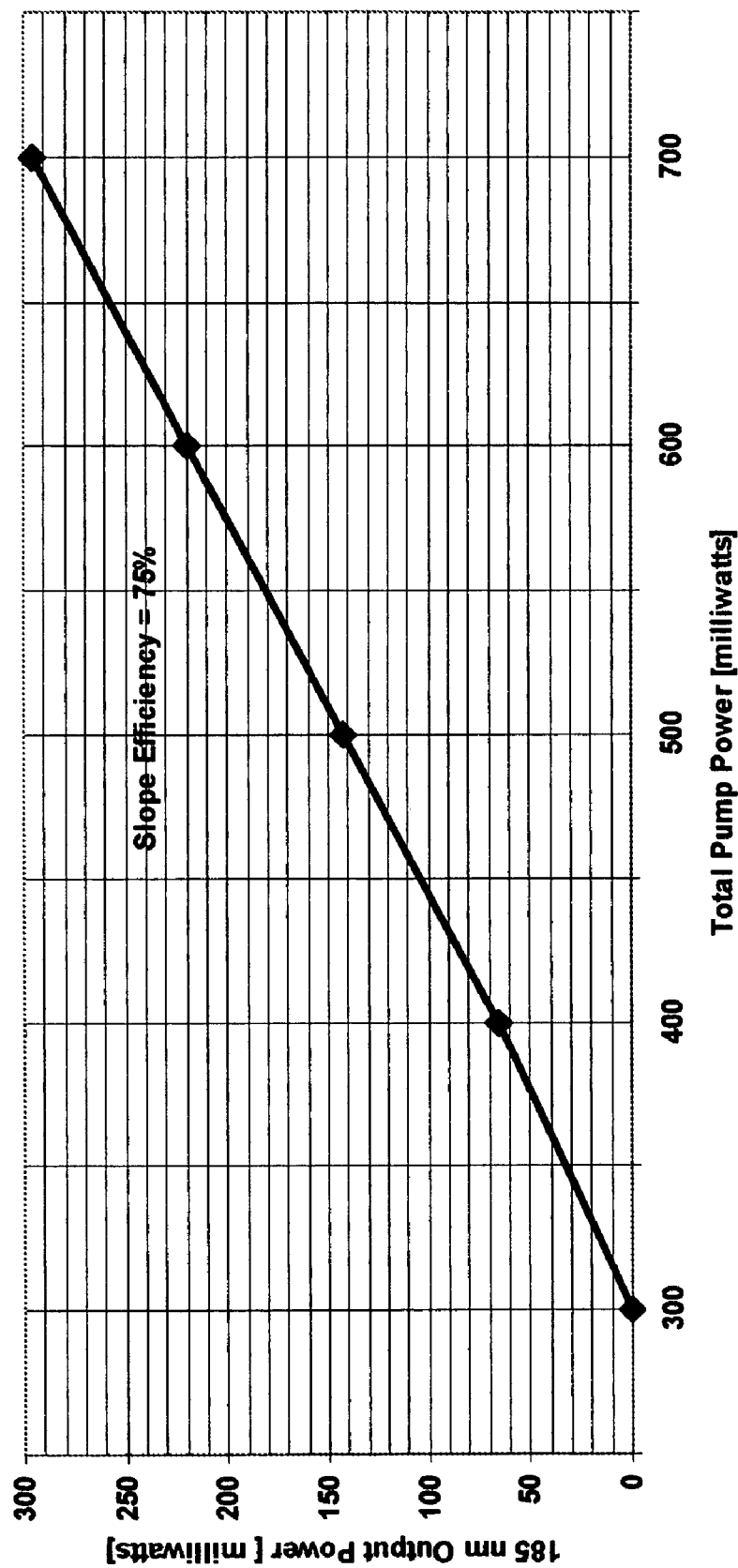
FIG. 4 shows calculated 185.0 nm continuous-wave output power vs. total 253.7 nm and 404.8 nm input drive laser power of a mercury DUV-OPAVL.

Key pump laser and OPAVL device parameters assumed for the analysis are given, along with the key projected performance characteristics. FIG. 4 shows the calculated output power at 185.0 nm as a function of total drive power at 253.7 nm and 404.8 nm (assumed to have equal power in the calculation). FIG. 4 shows a projected output power of 140 mW with a total input power of 500 mW, corresponding to the high slope power efficiency of ~75%, and an optical-optical power conversion efficiency of >28%. FIG. 4 also indicates that this laser is not saturated at 500 mW of pump power. Additional calculations show that multi-watt 185 nm lasers are feasible with increased input pump powers. In the present example, the assumed vapor cell conditions of a mercury density of $1.6 \times 10^{14}$/cc (cell temperature of 37 C.), an argon buffer pressure of 1 atmosphere, and a nitrogen buffer pressure of 1 atmosphere, are convenient for the realization of a practical commercial mercury 185.0 nm DUV-OPAVL.

TABLE 2

Calculated performance of a 140 mW 185.0 nm mercury DUV-OPAVL

| Parameter | Value | Unit |
|---|---|---|
| mercury number density | $1.6 \times 10^{14}$ | atoms/cc |
| mercury gain cell temperature | 37 | C. |
| input power @ 253.7 nm | 250 | mW |
| input power @ 404.8 nm | 250 | mW |
| pump and laser beam diameter | 25 | μm |
| input flux @ 253.7 nm | 50 | kW/$cm^2$ |
| input flux @ 404.8 nm | 50 | kW/$cm^2$ |
| laser gain cell length | 1 | cm |
| output coupler reflectivity (185.0 nm) | 20 | % |
| output power @ 185.0 nm | 142 | mW |
| power slope efficiency | 75 | % |
| power conversion efficiency | 28 | % |

Drive Laser Sources for a 185 nm Mercury OPAVL

Implementation of a practical 185.0 nm mercury DUV-OPAVL requires the availability of practical first and second pump laser sources at 253.7 nm and 404.8 nm, respectively. Both of these wavelengths are longer than ~250 nm, a spectral range where practical NLO materials are available (based on the commercial availability of laser sources using NLO materials operating at such wavelengths). Thus, it is straightforward to produce first and second drive laser sources based on a number of different conventional commercially-available infrared primary laser sources: 1) diode-pumped solid state lasers (DPSSLs); 2) diode-pumped fiber lasers; 3) optically-pumped semiconductor lasers (OPSLs). Several first and second pump laser configurations, and preferred configurations among them, are described below.

Figure 5:
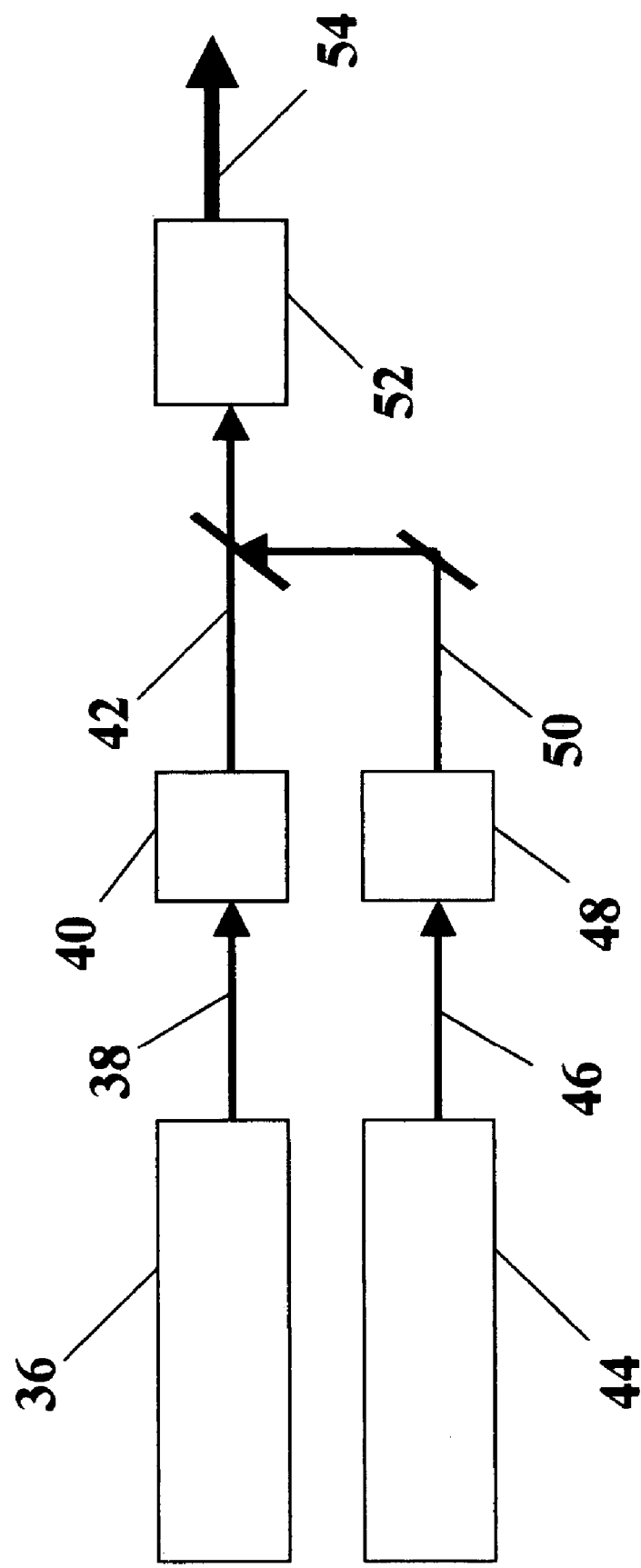
FIG. 5 shows a block diagram of a 253.7 nm first pump laser source for use in a mercury 185 nm OPAVL, based on sum frequency mixing of two visible wavelength laser beams, each produced by frequency-doubled infrared diode-pumped solid state lasers.

FIG. 5 shows a block diagram of a 253.7 nm first pump laser source for use in a mercury 185 nm OPAVL, based on sum frequency mixing of two visible wavelength laser beams, each produced by frequency-doubled infrared diode-pumped solid state lasers. The elements depicted in FIG. 5 are as follows: a first diode-pumped solid state laser 36 emitting a beam 38 at a wavelength of $\lambda_1$; a first nonlinear frequency doubling crystal 40, cut to be phase-matched at the wavelength of the input beam 38, and producing a visible output beam 42 at a wavelength of $\lambda_1/2$; a second diode-pumped solid state laser 44 emitting a beam 46 at a wavelength of $\lambda_2$; a second nonlinear frequency doubling crystal 48, cut to be phase-matched at the wavelength of the input beam 46, and producing a visible output beam 50 at a wavelength of $\lambda_2/2$; a nonlinear sum frequency mixing crystal 52, cut to mix visible wavelength input beams 42 and 50, producing an output beam 54 at a wavelength of 253.7 nm. To achieve an output beam 54 with the specified wavelength of 253.7 nm, the two infrared diode-pumped solid state lasers 36 and 44 must be selected in combination such that energy and momentum is conserved in the cascade doubling and mixing processes represented in FIG. 5. An example of a pair of specific diode-pumped solid state lasers sources 36 and 44 that emit at fundamental wavelengths that can generate the desired output wavelength of 253.7 nm are Nd:YAP ($\lambda_1$=930 nm) and Nd:YAG ($\lambda_2$=1116 nm). A second example is the pair Nd:YAG (($\lambda_1$=938 nm) and Nd:YAG ($\lambda_2$=1105 nm). While other pairs of lasers can be identified, these specific pairs are attractive because both Nd:YAP and Nd:YAG are well-developed commercially available laser crystals. There are a number of well-developed nonlinear frequency doubling crystals that can serve as elements 40 and 48, including bulk KTP, $LiNbO_3$, $KNbO_3$ (and their periodically-poled analogs), and LBO crystals. The commercially available BBO and CLBO nonlinear UV mixing crystals are examples of crystals that may be used to perform the frequency-mixing function of element 52 of FIG. 5.

Figure 6:
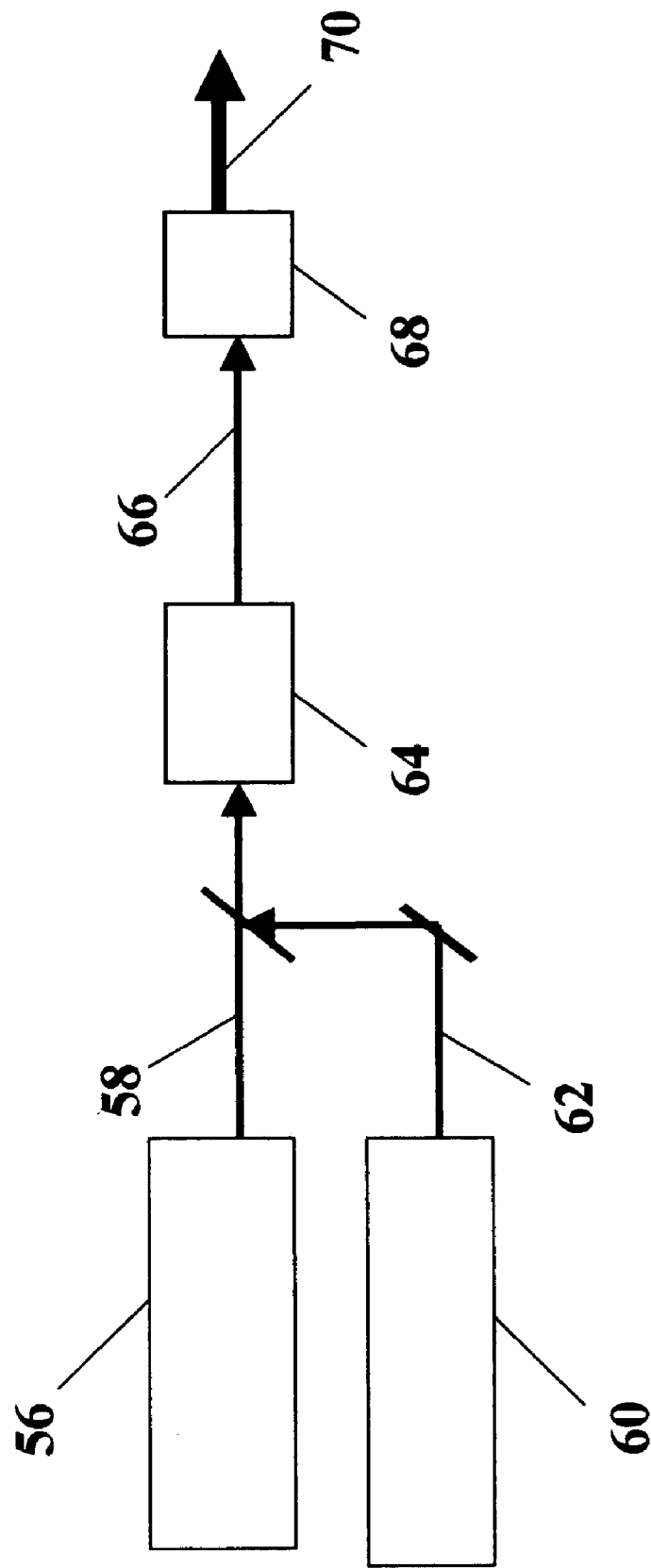
FIG. 6 is a block diagram of a 253.7 nm first pump laser source for use in a mercury 185 nm OPAVL based on frequency-doubling of a visible laser beam with a wavelength of 507.4 nm, produced by sum frequency mixing of two infrared diode pumped solid state lasers.

FIG. 6 shows a block diagram of a variant of the scheme shown in FIG. 5, for a 253.7 nm first pump laser source for use in a mercury 185 nm OPAVL. The elements depicted in FIG. 6 are as follows: a first diode-pumped solid state laser 56 emitting a beam 58 at a wavelength of $\lambda_1$; a second diode-pumped solid state laser 60 emitting a beam 62 at a wavelength of $\lambda_2$; a nonlinear sum frequency mixing crystal 64, cut to be phase-matched to mix infrared wavelengths of the input beams 58 and 62, producing an output beam 66 at a wavelength of 507.4 nm; a nonlinear frequency doubling crystal 68, cut to be phase-matched at the visible wavelength of 507.4 nm of the input beam 66, and producing output beam 70 at a wavelength of 253.7 nm; to achieve an output beam 70 with the specified wavelength of 253.7 nm, the two infrared diode-pumped solid state lasers 56 and 60 must be selected in combination such that energy and momentum is conserved in the cascade mixing and doubling processes represented in FIG. 6. In similarity to FIG. 5, an example of a pair of specific diode-pumped solid state lasers sources 56 and 60 in the scheme of FIG. 6 that emit at fundamental wavelengths that can generate the desired output wavelength of 253.7 nm are Nd:YAP ($\lambda_1$=930 nm) and Nd:YAG ($\lambda_2$=1116 nm). A second example is the pair Nd:YAG (($\lambda_1$=938 nm) and Nd:YAG ($\lambda_2$=1105 nm). Again, while other pairs of lasers can be identified, these specific pairs are attractive because both Nd:YAP and Nd:YAG are well-developed commercially available laser crystals. There are a number of well-developed nonlinear frequency doubling crystals that can serve as element 64 for FIG. 6, including bulk KTP, LiNbO$_3$, KNbO$_3$ (and their periodically-poled analogs), and LBO crystals. The commercially available BBO and CLBO nonlinear UV crystals are examples of crystals that may be used to perform the frequency-doubling function of element 68 of FIG. 6.

Figure 7:
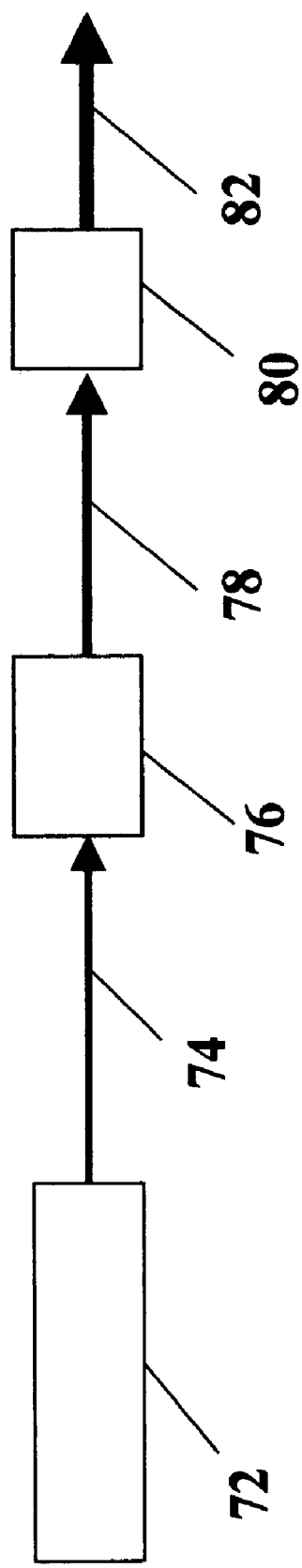
FIG. 7 is a block diagram of a 253.7 nm first pump laser source for use in a mercury 185 nm OPAVL based on fourth harmonic conversion of a diode-pump laser emitting at a wavelength of 1014.8 nm.

While technically feasible, the 253.7 nm source generation schemes shown in FIG. 5 and 6 are relatively complex. FIG. 7 shows a block diagram of a 253.7 nm first pump source for a 185 nm mercury OPAVL based on fourth harmonic generation from a single fundamental source emitting at a wavelength of 1014.8 nm. The elements depicted In FIG. 7 are as follows: a diode-pumped laser 72 emitting an output beam 74 at a wavelength of ~1014.8; a first frequency doubling nonlinear crystal 76, cut to be phase-matched at the wavelength of the input beam 74 producing an output beam 78 at a wavelength of 507.4 nm; a second frequency doubling nonlinear crystal 80, cut to be phase-matched at the wavelength of 507.4 nm of the input beam 78, producing an output beam 82 at a wavelength of 253.7 nm. To generate the precise demand wavelength of the first pump source for a 185 nm mercury OPAVL at 253.7 nm, the diode-pumped infrared laser source 72 of FIG. 7 must be set to emit at exactly 4 times longer wavelength, or 1014.8 nm. There are several diode-pumped laser sources capable of meeting this requirement, including: 1) a diode-pumped ytterbium (Yb) doped fiber laser or MOPA; 2) a diode-pumped semiconductor laser (OPSL), and 3) a diode-pumped Yb:YLiF$_4$ laser. There are a number of well-developed nonlinear frequency doubling crystals that can serve as element 76 for FIG. 7, including KTP, LiNbO$_3$, KNbO$_3$ (and their periodically-poled realizations), and LBO. The commercially available BBO and CLBO nonlinear UV crystals are examples of crystals that may be used to perform the frequency-doubling function of element 80 of FIG. 7.

Figure 8:
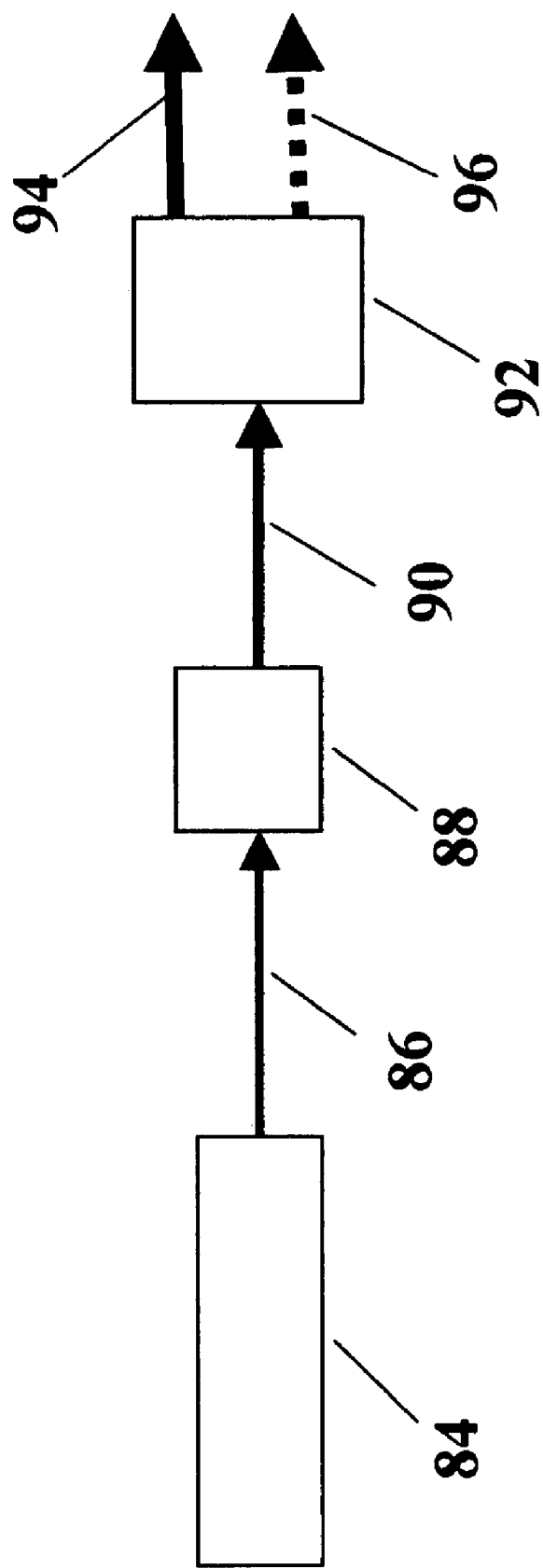
FIG. 8 is a block diagram of a 404.8 nm second pump laser for use in a 185 nm mercury OPAVL based on optical parametric generation.

FIG. 8 shows a block diagram of a second pump laser source emitting at a wavelength of 404.8 nm for use in a mercury 185 nm OPAVL, based on an optical parametric oscillator (OPO). The elements depicted in FIG. 8 are as follows: a diode-pumped solid state laser 84 emitting an output beam 86 at a wavelength $\lambda_3$ in the near infrared; a frequency tripler 88 whose nonlinear crystals are cut to be phase-matched at a wavelength of the input beam 86, producing an output beam 90 at a wavelength $\lambda_3/3$; a nonlinear optical parametric oscillator crystal 92, cut to optimally generate a signal output beam 94 at a wavelength of 404.8 nm and an idler beam 96 at a wavelength of ~2864 nm. Nd:YAG or Nd:YVO$_4$ are typical convenient and practical choices for the diode-pumped laser source 84 that emit with $\lambda_3$=~1064 nm resulting in a frequency-tripled beam 90 at a wavelength of ~355 nm. The commercially available BBO and CLBO nonlinear UV crystals are examples of crystals that may be used to perform the OPO function of element 92 of FIG. 8.

Figure 9:
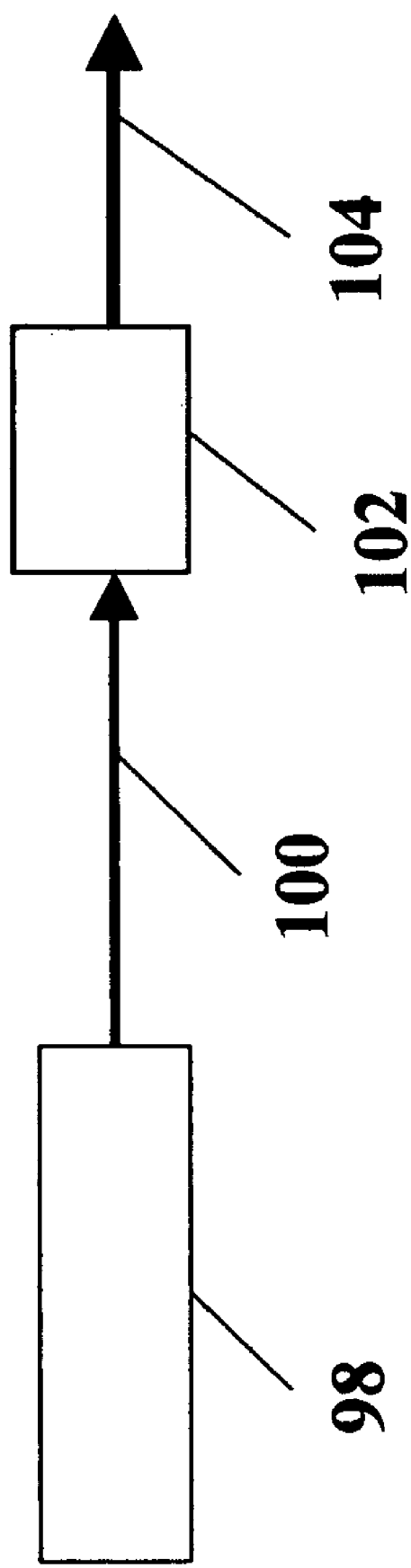
FIG. 9 is a block diagram of a 404.8 nm second pump laser for use in a 185 nm mercury OPAVL based on frequency doubling of a diode-pumped laser source.

While technically feasible, the 404.8 nm source generation scheme shown in FIG. 8 is relatively complex. FIG. 9 shows a block diagram of a 404.8 nm second pump source emitting at a wavelength of 404.8 for a 185 nm mercury OPAVL, based on fourth harmonic generation from a laser source emitting a wavelength $\lambda 4$ of 808.6 nm. The elements depicted in FIG. 9 are as follows: a diode-pumped laser 98 emitting output beam 100 at a wavelength of 809.6 nm; a frequency doubling nonlinear crystal 102, cut to be phased matched at the wavelength of $\lambda 4$ of 809.6 nm of the input beam 100, producing an output beam 104 at a wavelength of 404.8 nm. To generate the precise wavelength of 404.8 nm for the second pump source of a 185 nm mercury OPAVL, the diode-pumped infrared laser source 98 of FIG. 9 must be set to emit at exactly twice this wavelength, or 809.6 nm. There are several diode-pumped laser sources capable of meeting this requirement, including: 1) a diode-pumped thulium (Tm) doped fiber laser or MOPA, 2) a diode-pumped semiconductor laser (OPSL), 3) an AlGaAs semiconductor tapered MOPA.

From these examples, it is clear that there are a great many approaches to providing input drive laser sources emitting at 253.7 and 404.8 nm, as will be obvious to those skilled in the art The first and second pump lasers described above may be rendered in either continuous-wave or high-repetition-rate output formats through well-known harmonic generator and sum-frequency-mixing design principles. Because of their relative technical superiority and simplicity, the embodiment shown in FIG. 7 is a preferred embodiment to generate first pump radiation at 253.7 nm, and the embodiment shown in FIG. 9 is the preferred embodiment to generate second pump radiation at 404.8 nm.

In analogy with atomic mercury as the working gain medium for a 185.0 nm DUV-OPAVL, cadmium and zinc atomic group IIB atomic vapors may also serve as active media for DUV OPAVLs because they each manifest an electronic structure that is analogous to that of mercury. Table 3 lists the principal laser spectroscopic parameter values for the mercury OPAVL discussed in detail above, and the analogous parameter values for cadmium and zinc OPAVLs.

TABLE 3

Laser spectroscopic parameter values for Hg, Cd, and Zn OPAVLs

| atom | Transition | Transition wavelength, nm | Transition labels |
|---|---|---|---|
| Hg | First pump | 253.7 | 6 s$^2$ $^1$S$_0$–6s 6p $^3$P$_1$ |
| Hg | Second pump | 404.8 | 6s 6p $^3$P$_0$–6s 7s $^3$S$_1$ |
| Hg | Idler laser | 1207 | 6s 7s $^3$S$_1$–6s 6p $^1$P$_1$ |
| Hg | Laser output | 185.0 | 6s 6p $^1$P$_1$–6s$^2$ $^1$S$_0$ |
| Cd | First pump | 326.1 | 5 s$^2$ $^1$S$_0$–5s 5p $^3$P$_1$ |
| Cd | Second pump | 467.8 | 5s 5p $^3$P$_0$–5s 6s $^3$S$_1$ |
| Cd | Idler laser | 1283 | 5s 6s $^3$S$_1$–5s 5p $^1$P$_1$ |
| Cd | Laser output | 228.9 | 5s 5p $^1$P$_1$–5s$^2$ $^1$S$_0$ |
| Zn | First pump | 307.7 | 4 s$^2$ $^1$S$_0$–4s 4p $^3$P$_1$ |
| Zn | Second pump | 468.1 | 4s 4p $^3$P$_0$–4s 5s $^3$S$_1$ |
| Zn | Idler laser | 1444 | 4s 5s $^3$S$_1$–4s 4p $^1$P$_1$ |
| Zn | Laser output | 213.9 | 4s 4p $^1$P$_1$–4s$^2$ $^1$S$_0$ |

From Table 3 it can be seen that the cadmium atom serves as the working medium of an OPAVL emitting at an output wavelength of ~228.9 nm, utilizes a first pump laser with a wavelength of ~326.1 nm, a second pump laser with a wavelength of ~467.8 nm, and having an idler laser transition wavelength of ~1283 nm. It can also be seen that the zinc atom serves as the working medium of an OPALV emitting at an output wavelength of 213.9 nm, utilizes a first pump laser with a wavelength of ~307.7 nm, a second pump laser with a wavelength of ~468.1 nm, and having an idler laser transition wavelength of ~1444 nm. First and second pump sources for use in cadmium and zinc OPAVLs can be provided using the same basic schemes shown in FIGS. 5–9, as the demand pump wavelengths all lie within the wavelength region of practical nonlinear optical materials (i.e., wavelengths longer than ~250 nm). Of course, appropriate selections of the infrared laser sources utilized to produce each final output wavelength for pumping an OPAVL, must be based on the corresponding demand fundamental operating wavelengths.

In these respects, the DV-OPAVL scheme according to the present invention substantially departs from the conventional concepts and designs of the prior art, and in so doing provides practical ultraviolet continuous wave, or low-peak-power, high-repetition-rate lasers.

As to a further discussion of the manner of usage and operation of the present invention, the same should be apparent from the above description. Accordingly, no further discussion relating to the manner of usage and operation will be provided.

REFERENCES

1. A. V. Smith, W. J. Alford, and G. R. Hadley, "Optimization of two-photon-resonant, four-wave mixing: application to 130.2-nm generation in mercury vapor", J. Opt Soc. Am., B5, 1503–1519 (1988).
2. Andrew J. Merriam and James J. Jacob, System and Method for Generating Coherent Radiation at Vacuum Ultraviolet Wavelengths Using Efficient Four Wave Mixing, U.S. Pat. No. 6,525,868 B2
3. A. Caprara, S. Butterworth, Y. Kil, T. Thonn, K Hubbard, A. MacLeod, E. Rea, C. Seaton, and L. Spinelli, "200 mW continuous wave laser source at 198.5 nm for lithographic applications", SPIE symposium Optical Microlithography XVII, Santa Clara, Calif. Feb. 23–27, 2004. To be published in SPIE proceedings volume 5377.
4. Shahriar Ghaffari, Conventional Light-Pumped High-Power System for Medical applications, U.S. Pat. No. 5,769,844
5. Anthony E. Siegman, Neil C. Holmes, Max T. Artusy, "RF Excited Mercury Laser Lamp", U.S. Pat. No. 4,188,591.
6. M. Artusy, N. Holmes, and A. E. Siegman, "dc-excited and sealed-off operation of the optically pumped 546.1 Hg laser", Appl. Phys. Letters, 28, 133–134 (1976).
7. N. C. Holmes and A. E. Siegman, "The optically pumped mercury vapor laser", J. Applied Physics, 49, 3155–3170 (1978).
8. N. Djeu and R. Burnham, "Optically pumped cw Hg laser at 546.1 nm" Appl. Phys. Letters, 25, 350–351 (1974).
9. V. B. Znamenskii, "Optically pumped pulsed laser with a mixture of mercury ($\lambda$=546.1 nm) and nitrogen", Sov. Phys. Tech. Phys., 23, 244–245 (1978).

The above nine references are incorporated herein by reference.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An optically-pumped atomic vapor laser (OPAVL) comprising:
   a gaseous laser gain medium, wherein said gain medium comprises a mixture that includes a group IIB atomic vapor combined with at least one buffer gas;
   a laser cavity with a high reflectivity, or Q-factor, at two wavelengths dictated by the choice of said group IIB atomic vapor, an internal "idler" wavelength and the deep ultraviolet (DUV) output wavelength of the first electric-dipole-allowed resonance transition, wherein said gaseous medium is operatively located in said laser cavity;
   a first pump laser configured to provide a first pump laser beam of radiation having a first pump wavelength substantially matching the wavelength of a first pump transition of said group IIB atomic vapor;
   a second pump laser configured to provide a second pump laser beam of radiation having a second pump wavelength substantially matching the wavelength of a second pump transition of said group IIB atomic vapor; and
   means for directing said first pump laser beam and said second pump laser beam into said gaseous laser medium.

2. The laser of claim 1, wherein said group IIB atomic vapor comprises electronic level (EL) 1, EL 2, EL 3, EL 4, EL 5 and EL 6, wherein said first pump wavelength substantially matches the wavelength of an atomic vapor transition of said group IIB atomic vapor from EL 1 to EL 3 and wherein said first pump laser beam of radiation having a first pump wavelength excites electrons of said atomic vapor from said EL 1 to said EL 3, to produce electronically excited EL 3 atoms, wherein said excited EL 3 atoms collide with said at least one buffer gas, causing electrons in said EL 3 to redistribute among said EL 3, said EL 2 and said EL 4, approaching a Boltzmann electron population distribution among said EL 2, said EL 3 and said EL 4, wherein said Boltzmann population distribution is characterized by a temperature substantially equal to the transitional temperature of said at least one buffer gas, wherein said second pump wavelength substantially matches the wavelength of an atomic vapor transition from said EL 2 to said EL 6, and wherein said second pump laser beam of radiation having a second pump wavelength further excites electrons from said EL 2 to said EL 6, wherein said "idler" transition corresponds to a transition from said EL 6 to said EL 5, wherein laser action in said "idler" transition transfers the electron population from said EL 6 to said EL 5, which in turn, generates an electron population inversion between said EL 5 and said EL 1, wherein laser output occurs at an output wavelength that corresponds to the transition from said EL 5 to said EL 1.

3. The laser of claim 2, wherein said first pump laser comprises a first continuous wave (cw) laser and wherein said second pump laser comprises a second cw laser, wherein a steady-state population inversion can be produced between said EL 5 and said EL 1 to produce a CW laser output.

4. The laser of claim 2, wherein said first pump laser comprises a first repetitively-pulsed laser and wherein said second pump laser comprises a second repetitively-pulsed laser, wherein a repetitive transient population inversion can be produced between said EL 5 and said EL 1 to produce a repetitively-pulsed laser output.

5. The laser of claim 2, wherein said group IIB atomic vapor is selected from the group consisting of mercury, cadmium and zinc.

6. The laser of claim 2, wherein when said group IIB atomic vapor comprises mercury, said at least one buffer gas is selected from the group consisting of helium, argon, krypton, neon, xenon, carbon monoxide, and nitrogen.

7. The laser of claim 5, wherein when said group IIB atomic vapor comprises mercury (Hg), said first pump wavelength is 253.7 nm, wherein said EL 1 is the $6s^2\ {}^1S_0$ electronic level of Hg, wherein said EL 3 is the $6s\ 6p\ {}^3P_1$ electronic level of Hg, wherein said second pump wavelength is 404.8 nm, wherein said EL 2 is the 6s 6p $^3P_0$ electronic level of Hg, wherein said EL 6 is the 6s 7s $^3S_1$ electronic level of Hg, wherein said "idler" wavelength is 1207 nm, wherein said EL 5 is the 6s 6p $^1P_1$ electronic level of Hg and wherein said output wavelength is 185 nm.

8. The laser of claim 5, wherein when said group IIB atomic vapor comprises mercury, said first pump wavelength is 253.7 nm, said second pump wavelength is 404.8 nm, said "idler" wavelength is 1207 nm and said output wavelength is 185 nm.

9. The laser of claim 5, wherein when said group IIB atomic vapor comprises cadmium, said first pump wavelength is 326.1 nm, said second pump wavelength is 467.8 nm, said "idler" wavelength is 1283 nm and said output wavelength is 228.9 nm.

10. The laser of claim 5, wherein when said group IIB atomic vapor comprises zinc, said first pump wavelength is 307.7 nm, said second pump wavelength is 468.1 nm, said "idler" wavelength is 1444 nm and said output wavelength is 213.9 nm.

11. The laser of claim 1, wherein said gaseous medium is contained in a cell.

12. A method for producing deep ultraviolet laser (DUV) light, comprising:
providing a gaseous laser gain medium, wherein said gain medium comprises a mixture that includes a group IIB atomic vapor combined with at least one buffer gas;
providing a laser cavity with a high reflectivity, or Q-factor, at two wavelengths dictated by the choice of said group IIB atomic vapor, an internal "idler" wavelength and the DUV output wavelength of the first electric-dipole-allowed resonance transition, wherein said gaseous medium is operatively located in said laser cavity;
optically pumping a first pump transition of said group IIB atomic vapor with a first pump laser beam of radiation having a first pump wavelength substantially matching the wavelength of a first pump transition of said group IIB atomic vapor; and
optically pumping a second pump transition of said group IIB atomic vapor with a second pump laser beam of radiation having a second pump wavelength substantially matching the wavelength of a second pump transition of said group IIB atomic vapor.

13. The method of claim 12, wherein said group IIB atomic vapor comprises electronic level (EL) 1, EL 2, EL 3, EL 4, EL 5 and EL 6, wherein said first pump wavelength substantially matches the wavelength of an atomic vapor transition of said IIB atomic vapor from EL 1 to EL 3 and wherein said first pump laser beam of radiation having a first pump wavelength excites electrons of said atomic vapor from said EL 1 to said EL 3, to produce electronically excited EL 3 atoms, wherein said excited EL 3 atoms collide with said at least one buffer gas and cause electrons in said EL 3 atoms to redistribute among said EL 3, said EL 2 and said EL 4, approaching a Boltzman electron population distribution among said EL 2, said EL 3 and said EL 4, wherein said Boltzmann population distribution is characterized by a temperature substantially equal to the translational temperature of said at least one buffer gas, wherein said second pump wavelength substantially matches the wavelength of an atomic vapor transition from said EL 2 to said EL 6, and wherein said second pump laser beam of radiation having a second pump wavelength excites electrons from said EL 2 to said EL 6, wherein said "idler" transition corresponds to a transition from said EL 6 to said EL 5, wherein laser action in said "idler" transition transfers the electron population from said EL 6 to said EL 5, which in turn, generates an electron population inversion between said EL 5 and said EL 1, wherein laser output occurs at an output wavelength that corresponds to the transition from said EL 5 to said EL 1.

14. The method of claim 13, wherein said first pump laser comprises a first continuous wave (cw) laser and wherein said second pump laser comprises a second cw laser, wherein a steady-state population inversion can be produced between said EL 5 and said EL 1 to produce a CW laser output.

15. The method of claim 13, wherein said first pump laser comprises a first repetitively-pulsed laser and wherein said second pump laser comprises a second repetitively-pulsed laser, wherein a repetitive transient population inversion can be produced between said EL 5 and said EL 1 to produce a repetitively-pulsed laser output.

16. The method of claim 13, wherein said group IIB atomic vapor is selected from the group consisting of mercury, cadmium and zinc.

17. The method of claim 13, wherein when said group IIB atomic vapor comprises mercury, said at least one buffer gas is selected from the group consisting of helium, argon, krypton, neon, xenon, carbon monoxide, and nitrogen.

18. The method of claim 16, wherein when said group IIB atomic vapor comprises mercury (Hg), said first pump wavelength is 253.7 nm, wherein said EL 1 is the 6s$^2$ $^1S_0$ electronic level of Hg, wherein said EL 3 is the 6s 6p $^3P_1$ electronic level of Hg, wherein said second pump wavelength is 404.8 nm, wherein said EL 2 is the 6s 6p $^3P_0$ electronic level of Hg, wherein said EL 6 is the 6s 7s $^3S_1$ electronic level of Hg, wherein said "idler" wavelength is 1207 nm, wherein said EL 5 is the 6s 6p $^1P_1$ electronic level of Hg and wherein said output wavelength is 185 nm.

19. The method of claim 16, wherein when said group IIB atomic vapor comprises mercury, said first pump wavelength is 253.7 nm, said second pump wavelength is 404.8 nm, said "idler" wavelength is 1207 nm and said output wavelength is 185 nm.

20. The method of claim 16, wherein when said group IIB atomic vapor comprises cadmium, said first pump wavelength is 326.1 nm, said second pump wavelength is 467.8 nm, said "idler" wavelength is 1283 nm and said output wavelength is 228.9 nm.

21. The method of claim 16, wherein when said group IIB atomic vapor comprises zinc, said first pump wavelength is 307.7 nm, said second pump wavelength is 468.1 nm, said "idler" wavelength is 1444 nm and said output wavelength is 213.9 nm.

* * * * *